United States Patent [19]
Masuda et al.

[11] Patent Number: 5,774,751
[45] Date of Patent: Jun. 30, 1998

[54] IMAGING SYSTEM HAVING IMAGING DEVICE FOR USE WITH DIFFERENT ACCESSORIES

[75] Inventors: Hiroshi Masuda, Tokyo; Tetsuro Goto, Furabashi, both of Japan

[73] Assignee: Nikon Corporation, Tokyo, Japan

[21] Appl. No.: 832,964

[22] Filed: Apr. 4, 1997

Related U.S. Application Data

[60] Provisional application No. 60/037,956, Feb. 20, 1997.

[30] Foreign Application Priority Data

Apr. 4, 1996 [JP] Japan ..................................... 8-108416

[51] Int. Cl.$^6$ .................................................. G03B 17/00
[52] U.S. Cl. ............................................................ 396/297
[58] Field of Search .................................... 396/297, 298, 396/299, 300

[56] References Cited

U.S. PATENT DOCUMENTS 5,448,334  9/1995  Kaihara et al. ......................... 396/297

Primary Examiner—W. B. Perkey

[57] ABSTRACT

An imaging system is provided with an imaging device and either a first accessory or a second accessory mounted to the imaging device. The first accessory is capable of external operation, and has a first operating member which generates an electrical output according to the external operation of the first accessory. The second accessory is capable of external operation, and has a second operating member which generates an electrical output according to the external operation of the second accessory. The second accessory also has a data preparation device which prepares data based on the electrical output generated by the second operating member. The imaging system further has a discriminating device and electrical receptors. The discriminating device determines whether the first accessory or the second accessory is mounted to the imaging device. The electrical receptors receive the electrical output from the first operating member when the discriminating device determines that the first accessory is mounted to the imaging device and receive data prepared by the data preparation mechanism when the discriminating device determines that the second accessory is mounted to the imaging device.

4 Claims, 18 Drawing Sheets

| M (4) | SHUTTER DISPLAY |
|---|---|
| 00 | 1 |
| 01 | 2 |
| 02 | 4 |
| 03 | 8 |
| 04 | 15 |
| 05 | 30 |
| 06 | 60 |
| 07 | 125 |
| 08 | 250 |
| 09 | 500 |
| 0A | 1000 |

FIG. 12A

| M (5) | APERTURE DISPLAY |
|---|---|
| 00 | F 1 |
| 01 | F 1.4 |
| 02 | F 2 |
| 03 | F 2.8 |
| 04 | F 4 |
| 05 | F 5.6 |
| 06 | F 8 |
| 07 | F 11 |
| 08 | F 16 |
| 09 | F 22 |
| 0A | F 32 |

FIG. 12B

IMAGING SYSTEM HAVING IMAGING DEVICE FOR USE WITH DIFFERENT ACCESSORIES

CROSS REFERENCE TO RELATED APPLICATIONS

This application is based upon and claims priority to Japanese Patent Application No. 8-108416, filed Apr. 4, 1996, the contents of which are incorporated herein by reference. This application also claims the benefit of the provisional application filed Feb. 20, 1997 entitled IMAGE PICKUP DEVICE AND IMAGE PICKUP SYSTEM having a Ser. No. 60/037,956.

BACKGROUND OF THE INVENTION

1. Field of the Invention

The present invention relates to an imaging device which is capable of mounting thereon an accessory equipped with an operating member.

2. Description of the Related Art

In a camera system which combines a camera body and an operating member positioned in a detachable back cover, it is possible that the operating member may emit signals, but otherwise be unable to communicate with a microcomputer located in the camera. Such an operating member/detachable back cover is referred to as a "normal back cover." When a camera body is combined with a normal back cover, the signals emitted from the detachable back cover are read by the microcomputer located in the camera body via contact points on the camera body.

It is also possible that the operating member may be directly capable of communicating with the camera body in addition to emitting the signals emitted by the normal back cover. This type of operating member/detachable back cover is referred to as a "data back." For a data back, the camera body must be equipped with contact points for reading the emitted signals and also must be equipped with contact points for direct communication with the data back. However, the numerous contact points increases cost. To avoid the increased cost, the contact points for the operating member were eliminated, causing disconnection, and to perform communication with the camera body, an additional microcomputer had to be provided in the back cover. Thus, even though the number of contact points was reduced, costs increased.

SUMMARY OF THE INVENTION

Accordingly, it is an object of the present invention to provide an imaging system, in which it is not necessary to arrange a microcomputing unit ("MCU") for the purpose of communication with an accessory when communication with that accessory is not possible.

Additional objects and advantages of the invention will be set forth in part in the description which follows, and, in part, will be obvious from the description, or may learned by practice of the invention.

In order to attain these objects an imaging system is provided with an imaging device and either a first accessory or a second accessory mounted to the imaging device. The first accessory is capable of external operation, and has a first operating member which generates an electrical output according to the external operation of the first accessory. The second accessory is capable of external operation, and has a second operating member which generates an electrical output according to the external operation of the second accessory. The second accessory also has a data preparation device which prepares data based on the electrical output generated by the second operating member. The imaging system further has a discriminating device and electrical receptors. The discriminating device determines whether the first accessory or the second accessory is mounted to the imaging device. The electrical receptors receive the electrical output from the first operating member when the discriminating device determines that the first accessory is mounted to the imaging device and receive data prepared by the data preparation means when the discriminating device determines that the second accessory is mounted to the imaging device.

BRIEF DESCRIPTIONS OF THE DRAWINGS

These and other objects and advantages of the invention will become apparent and more readily appreciated from the following description of the preferred embodiments taken in conjunction with the accompanying drawings of which:

FIGS. 12A and 12B are conceptual diagrams respectively showing shutter speeds and aperture values according to the first preferred embodiment of the invention;

DETAILED DESCRIPTION OF THE PREFERRED EMBODIMENTS

Figure 1:
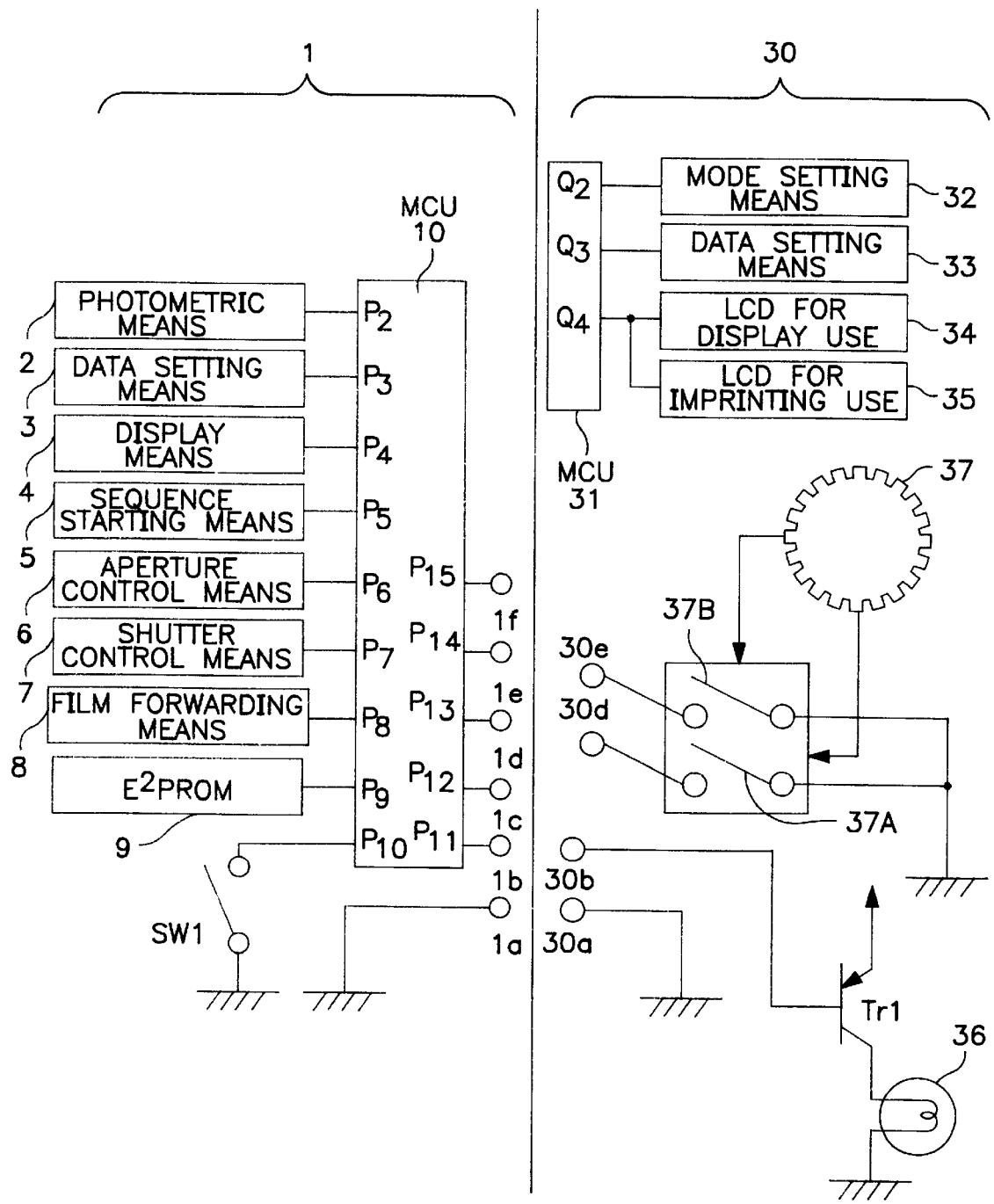
FIG. 1 is a block wiring diagram according to a first preferred embodiment of the invention, showing the invention being used with a simple data back.

Reference will now be made in detail to the present preferred embodiments of the present invention, examples of which are illustrated in the accompanying drawings, wherein like reference numerals refer to like elements throughout.

FIG. 1 is a block wiring diagram showing a first preferred embodiment of an imaging device and imaging system according to the present invention. In FIG. 1, reference numeral 1 represents a camera body, and reference numeral 30 represents an accessory which can be mounted to the camera body 1. The accessory 30 in this preferred embodiment is assumed to be a simple type of data back (of a type with which communication with the camera body is impossible). The camera body 1 has six contact points 1a through 1f; the simple data back (accessory) 30 has four contact points 30a, 30b, 30d and 30e. When the simple data back 30 is mounted to the camera body 1, the contact points 30a, 30b, 30d and 30e of the simple data back 30 are respectively connected to the contact points 1a, 1b, 1d and 1e of the camera body 1.

Reference numeral 2 denotes a well known photometric means. A microcomputing unit ("MCU") 10 performs A/D conversion on the output of the photometric means 2 to achieve a photometric output. Reference numeral 3 represents a data setting means, which inputs to the MCU 10 exposure control mode data, film sensitivity setting data, shutter speed setting data, or aperture data from the photographic lens. Switch SW1, which is normally OFF, is a release switch which becomes ON when the release button (not shown in the drawings) is depressed. Reference numeral 4 represents from a display means which displays each kind of exposure data with the assistance of an output from MCU 10. Reference numeral 5 represents a sequence starting means. After a predetermined calculation has ended, when the release switch is depressed and the release switch SW1 is ON, a release sequence commences, started by the MCU 10. For example, current is passed to a magnet within the sequence starting means 5, and the operation of raising a mirror commences. Reference numeral 6 is an aperture control means which performs automatic aperture control in a P mode and an S mode. Reference numeral 7 represents a shutter control means which controls the shutter blinds using a shutter speed calculated by the MCU 10 based on a shutter speed setting. Reference numeral 8 represents a shutter charge film forwarding means which performs shutter charging and film winding after release, and performs rewinding. Reference numeral 9 represents an EEPROM, which stores film frame number and similar necessary data therein after the completion of photography. The memory of EEPROM 9 is stored even if the power supply to the camera body is OFF.

The MCU 10 performs APEX calculations based on the settings by the photometric means 2 or the data setting means 3, transmits a display output to the display means 4. After release, the MCU 10 controls the sequence starting means 5, the aperture control means 6, the shutter control means 7, shutter charge film forwarding means 8, EEPROM 9, etc. When the release button is depressed and the release switch SW1 is ON, the MCU 10, after performing the above-mentioned APEX calculations, starts the sequence starting means 5. The sequence starting means 5 raises the mirror. The MCU 10, after starting the sequence starting means 5, starts the aperture control means 6.

If MCU 10 is in an aperture priority mode (termed "A mode" hereinbelow) or in a manual exposure control mode (termed "M mode" hereinbelow), the MCU 10 does not generate an aperture stopping signal, but controls the aperture based on a value set by the aperture ring of the lens. On the other hand, if MCU 10 is in a program control mode (termed "P mode" hereinbelow) or in a shutter priority mode (termed "S mode" hereinbelow), the shutter ring of the lens moves toward the minimum aperture position, and the MCU 10 generates a stopping signal when the aperture reaches the desired opening. The aperture control means, receiving this signal, stops decreasing the aperture of the lens. The aperture is thus controlled for the appropriate exposure. Continuing, the MCU 10 starts the shutter control means 7, and the shutter control means 7 initiates movement of a front blind of the shutter. If MCU 10 is in the M mode, movement of a rear blind begins after a time determined according to the shutter speed setting. If MCU 10 is in the P mode, S mode or A mode, movement of the rear blind is initiated after a time determined according to the shutter speed calculated by the MCU 10.

Figure 2:
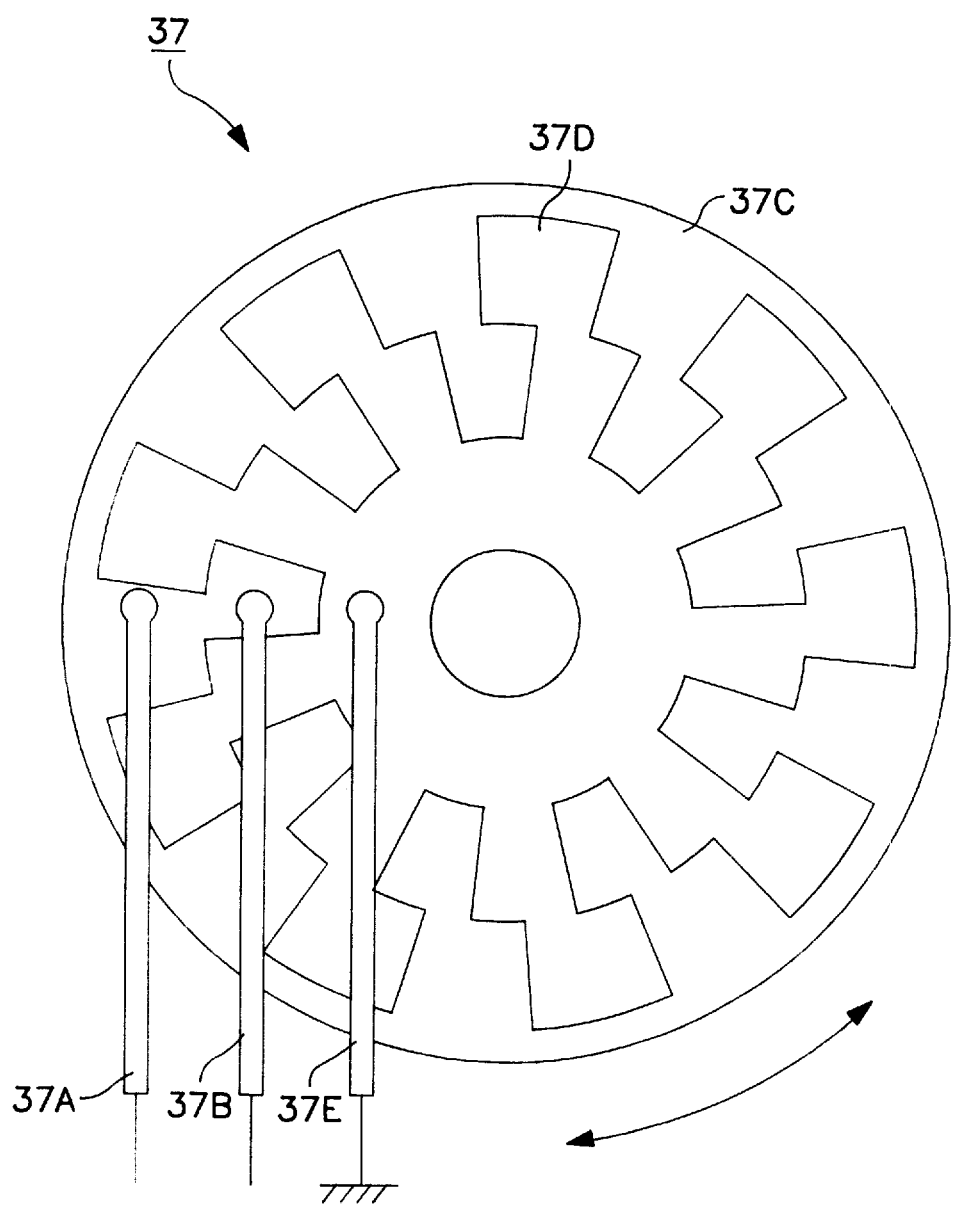
FIG. 2 is a plan view of a command dial according to the first preferred embodiment of the invention.
Figure 3A:
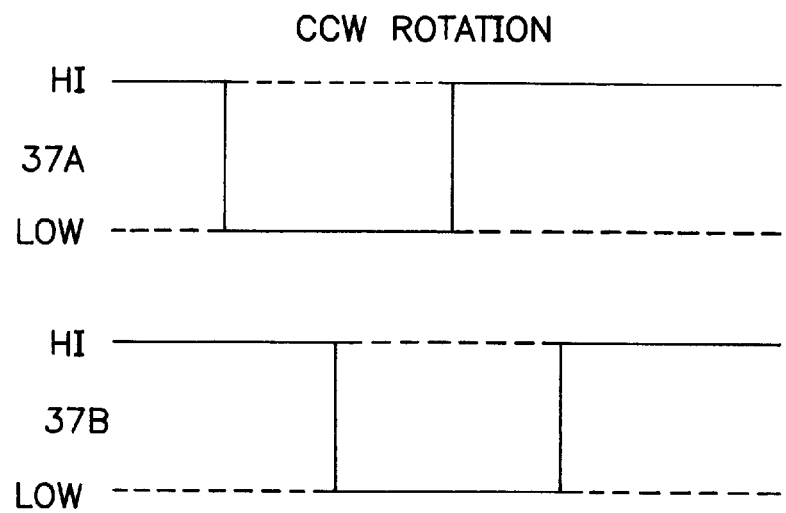
FIGS. 3A and 3B are timing charts showing patterns produced from counter-clockwise and clockwise rotation, respectively, of the command dial shown in FIG. 2.
Figure 3B:
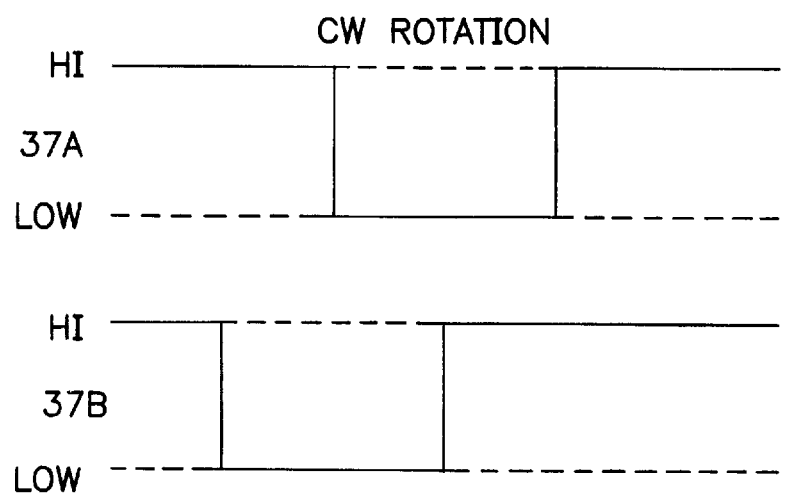

FIG. 2 is a diagram of a command dial 37 of the first preferred embodiment of the present invention. Command dial 37 may service as an exposure correction dial. FIGS. 3A and 3B are timing charts showing the pulses which the command dial 37 generates according to the first preferred embodiment of the present invention.

In the simple data back 30 (see FIG. 1), the exposure correction dial (command dial 37) is set when the simple data back 30 is mounted to the camera body 1. The contact points 37A and 37B of the command dial 37 connect to the ports P13 and P14 of the MCU via the contact points 30d and 30e.

In the command dial 37, the pattern baseplate 37C is mounted and rotates integrally with the command dial 37. The oblique line portion of FIG. 2 is a conductor portion 37D. A ground contact point 37E is normally connected to the conductor portion 37D. By connection of the contact points 37A and 37B with the conductor portion 37D, the potential signal between the contact points 37A and 37B becomes LOW. In FIG. 2, the contact points 37A and 37B are in the HI state (not connected to conductor portion 37D). With a click mechanism (not shown in the drawings) the command dial 37 is rotated.

After one click of rotation, the contact points 37A and 37B will again be in a HI state, as in FIG. 2. More specifically, when the command dial is operated to rotate 1 click in the counter-clockwise (CCW) direction, first the contact point 37A becomes LOW, and continuing, the second contact point 37B becomes LOW. See FIG. 3A. With further CCW rotation the first contact point 37A returns to HI, and then the contact point 37B returns to HI. At this point, one click is complete. Similarly, when rotated one click in the clockwise (CW) direction, contact points 37A and 37B end up being HI, as they started. See FIG. 3(b). For CCW rotation, contact point 37A is LOW when contact point 37B changes from HI to LOW. For CW rotation, contact point 37A is LOW when contact point 37B changes from LOW to HI. Command dials using different directions of rotation with rotation click numbers are known. Furthermore, rotating command dials with rotation click numbers which use two contact points are also known.

When the exposure correction dial (command dial 37) is operated, MCU 10 receives the signals of contact points 37A and 37B via the ports P13 and P14. The exposure amount is set by measuring the rotation direction and rotation click number of the command dial 37. More specifically, the exposure control amount was calculated during the APEX calculation.

The MCU 31 of the simple data back 30 has no serial communication with the MCU 10 of the camera body 1, and therefore cannot imprint data from the MCU 10 of the camera body 1. However, the simple data back 30 is capable of basic functions such as imprinting "year, month, day", "hour, minute, second" and the like, which are set by the data setting means 33. The mode is imprinted by the mode setting means 32, and is displayed by the display LCD 34 and the imprinting LCD 35.

Imprinting signals from the MCU 10 of the camera body 1 are received at a contact point 30b. Contact point 30b is connected to the base of a transistor Tr1, and by turning transistor Tr1 ON and OFF, the lamp 36 used for imprinting can be turned ON and OFF.

Figure 4:
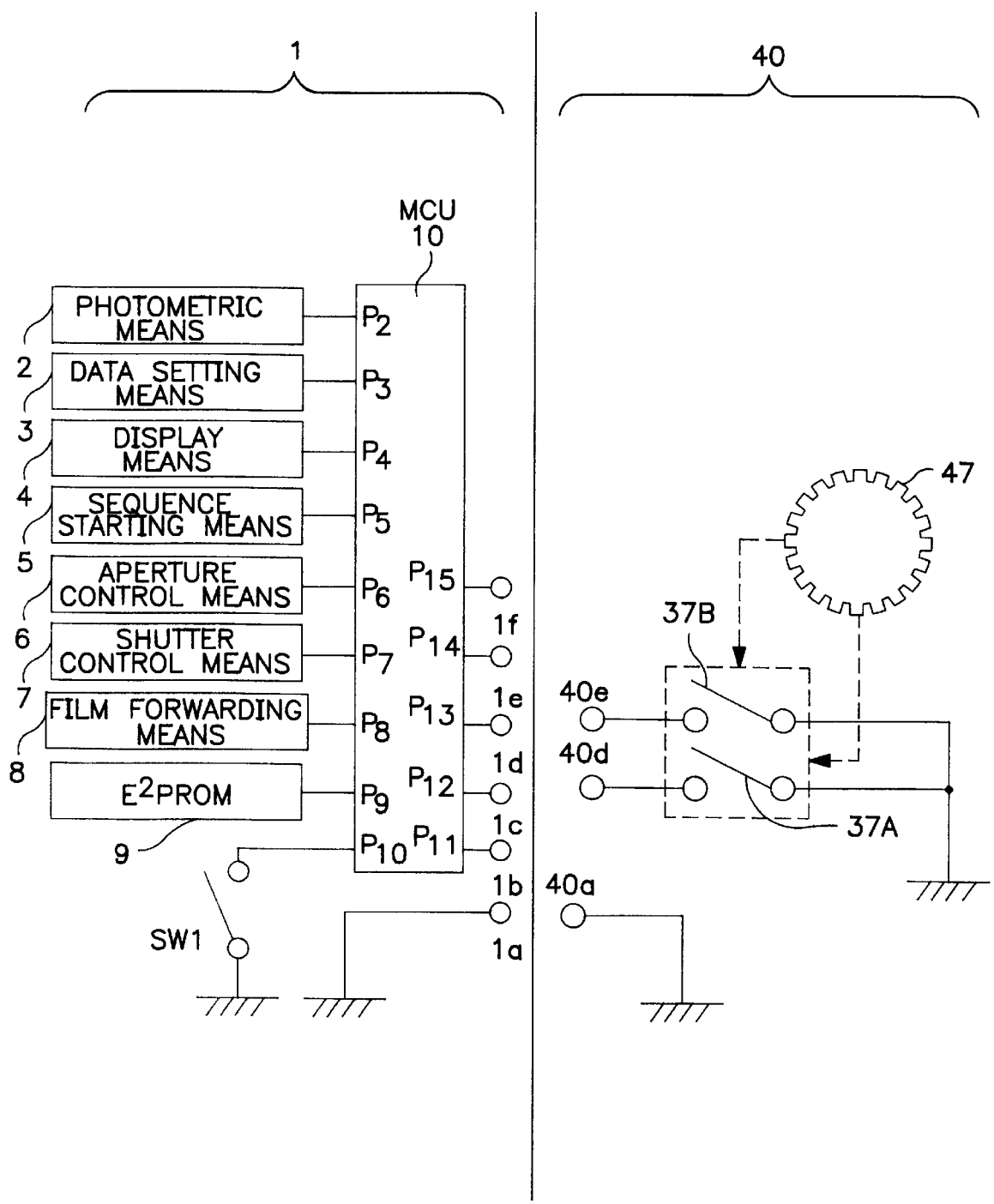
FIG. 4 is a block wiring diagram showing the first preferred embodiment of the invention, used with a normal back cover.

FIG. 4 is a block diagram of a first preferred embodiment of the present invention. Whereas FIG. 1 represents the combination of a camera body 1 and a simple data back 30, FIG. 4 represents a combination of a camera body 1 and a normal back cover 40 having no imprinting function. Normal back cover 40 is an accessory of the type with which communication with the camera body is impossible.

The camera body 1 has six contact points 1a–1f. The back cover 40 has 3 contact points 40a, 40d and 40e. When the back cover 40 is mounted to the camera body 1, the contact points 40a, 40d and 40e of the back cover are respectively connected to the contact points 1a, 1d and 1e of the camera body 1. The signals of an exposure correction dial 47 are counted by the MCU 10 as was done for the simple data back 30. The exposure amount is thereby set, displayed and controlled.

Figure 5:
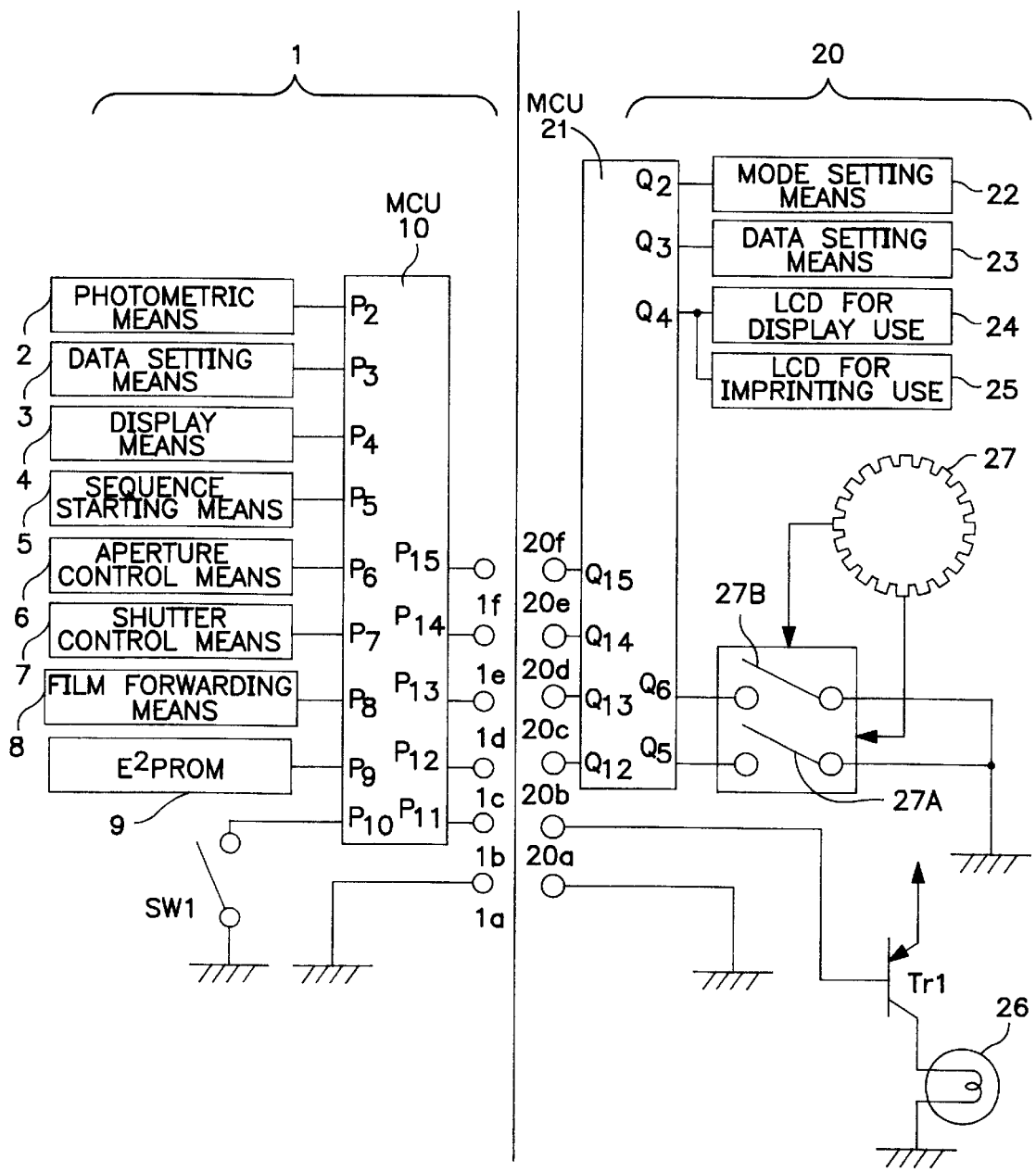
FIG. 5 is a block wiring diagram showing the first preferred embodiment of the invention, used with a high function data back.

FIG. 5 is a block diagram of a first preferred embodiment of the present invention. That is, FIG. 5 is a block diagram of a combination of a camera body 1 and a high function data back 20, an accessory capable of communication with the camera body. The camera body 1 has six contact points 1a–1f, the high function data back 20 also has six contact points 20a–20f, and when the high function data back is mounted to the camera body 1, the contact points 1a–1f and the contact points 20a–20f are respectively connected. Different from the cases of the simple data back 30 and the normal back cover 40, the high function data back 20 has an MCU 21 connected to exposure correction dial 27. The rotation direction and click number of the exposure correction dial 27 are counted by the MCU 21.

The high function data back, in addition to imprinting "year, month, day" or "hour, minute, second", is able to imprint the shutter speed and aperture value.

The transfer of 5 bytes of data between camera body 1 and high function data back 20 is as shown in Table 1.

TABLE 1

| Byte No. | Content | Memory of MCU 10 | Memory of MCU 21 | Transmission direction |
|---|---|---|---|---|
| 1 | data back flag | M(1) | DM(1) | 1 ← 20 |
| 2 | film sensitivity | M(2) | DM(2) | 1 → 20 |
| 3 | film frame number | M(3) | DM(3) | 1 → 20 |
| 4 | shutter speed data | M(4) | DM(4) | 1 → 20 |
| 5 | aperture data | M(5) | DM(5) | 1 → 20 |

In detail, after transmitting byte number 1 from the high function data back 20 to the camera body 1, the data of the remaining bytes is transmitted consecutively from the camera body 1 to the high function data back 20. The memory regions of MCU 21 and MCU 31 are labelled to show similarity and communication therebetween, M(1)–M(5) correspond respectively with DM(1) through DM(5), and can be represented as M(N) and DM(N) using a memory pointer N (N=1–5).

The first byte of data is data back flag, and is sent from the high function data back 20 to the camera body 1. The data of the first byte has a format shown in Table 2. Bit 7 is a flag to show that the data back is able to communicate, and is usually 1 when communication is possible. Bits 4 through 1 consist of a 4-bit signed integer (positive or negative) showing the rotation direction and rotation click number of the exposure correction dial 27 disposed in the high function data back 20.

TABLE 2

| Bit | Content |
|---|---|
| 7 | usually 1, as discrimination flag |
| 6 | undefined (0) |
| 5 | undefined (0) |
| 4 | ⎱ |
| 3 | ⎟ 4-bit data |
| 2 | ⎟ |
| 1 | ⎰ |
| 0 | undefined (0) |

The data of the second byte is thereafter sent from the camera body 1 to the high function data back 20. The data of the second byte relates to film sensitivity, and is a SV value set in the camera body 1 or which has been read out in DX code. The data of the third byte relates to the number of completed photographs and is a film frame number. The data of the third byte specifies the film frame number displayed in the camera body 1, but when no film is loaded into the camera is set as "$0E." The data of the fourth and fifth bytes relates to shutter speed data and aperture data, respectively and have the same format as a display on the camera body 1, as shown in FIGS. 12A and 12B.

Figure 6:
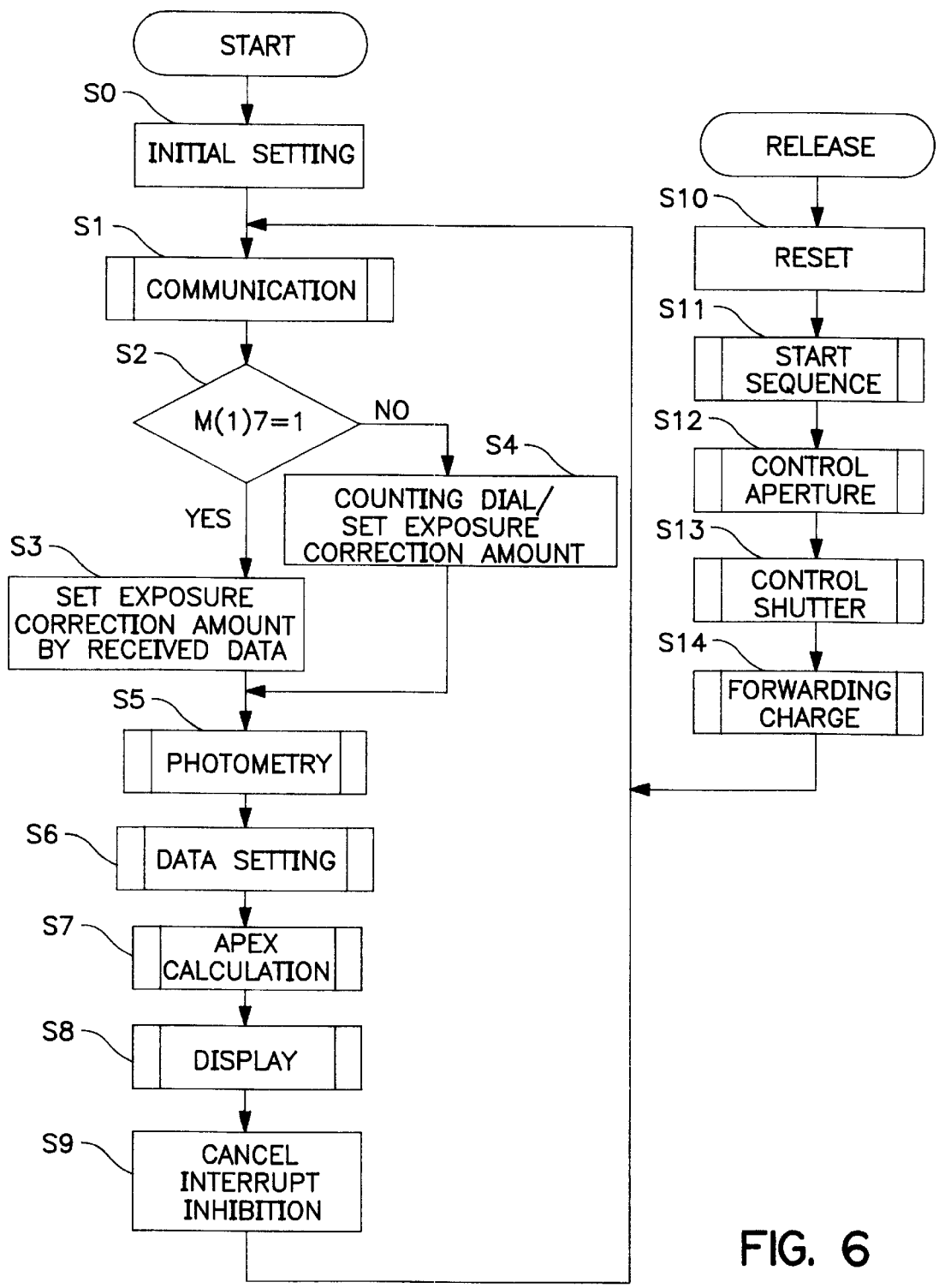
FIG. 6 is a flowchart of a main routine performed by an MCU contained within the camera body shown in FIGS. 1, 4 and 5.

FIG. 6 is a flow chart of the main routine of the MCU 10. Step S0, introducing a power supply, is an initial setting routine which is carried out only directly after the MCU 10 is reset. The initial setting routine performs release interrupt inhibition and sets similar settings directly after reset. That is, there is no interruption by an interruption subroutine on the first time through steps S1 through S8. In step S1, communication with the data back is performed by calling a communication subroutine to be described later. In step S2, it is determined whether bit 7 of memory location M(1) (first byte-data back flag) is 1 or not. If bit 7 is 1, the routine proceeds to step S3, and if it is 0, to step S4. Proceeding to step S4, it has been determined (because bit 7 is 0) that a high function data back 20 (accessory which can communicate with the camera body) is not mounted to the camera body 1. In this case, step S4 counts the direction of rotation and rotation click number of the exposure correction dial and sets the exposure correction amount via the contact points 1d and 1e.

Proceeding to step S3, communication has been established with a high function data back. The signed integer indicated by bits 1–4 of memory location M(l) (first byte-data back flag) is accepted. The signed integer shows the rotation direction and rotation click number of the exposure correction dial, and, based on the signed integer, the exposure correction amount is set.

When step S3 or step S4 ends, a photometric subroutine is performed in step S5. The photometric output received from the photometric means 2 is A/D converted, and this A/D converted value is stored. In step S6, a data setting subroutine is carried out, and the exposure control mode, the DX code of the cartridge, and various respective data of the lens, the set shutter speed, and the like are read. Next, in step S7, the APEX calculation subroutine is carried out with an exposure calculation being performed based on the data received in steps S5 and S6.

Furthermore, exposure correction is performed based on the exposure correction amount set in step S3 or step S4, and shutter speed and aperture value are determined for display or control purposes. In step S8, a display subroutine drives the display means 4, and the exposure value and exposure correction value, etc. are displayed. In step S9, release interruption inhibition is cancelled, and there is a return to step S1. Accordingly, usually after this, the interruption inhibition is cancelled. That is, the interruption subroutine of FIG. 7 will now interrupt.

Moreover, when release occurs, the interruption subroutine of FIG. 7, mentioned below, jumps from step S44 to step S10 of FIG. 6. In step S10, the stack is cleared. Namely, in any of the states up to the above-mentioned steps S1–S9 of FIG. 6, the state can change to the process from step S11. In step S11, a sequence start subroutine starts the sequence start means 5, and current is caused to flow to the magnets, causing the mirror to rise. Continuing, the aperture control subroutine is performed in step S12, and when the aperture of the lens has been decreased to a predetermined value, current is caused to flow to an aperture stop magnet of the shutter control means 6, and the aperture is locked. Next, in step S13, a shutter control subroutine is performed to control the shutter speed via in the shutter control means 7. In step S14, the mirror is lowered, the shutter is charged, and the film forwarding subroutine is carried out, all being performed by film forwarding means 8. When the operation ends, returning to step S1, there is again a changeover to photometry. Continuing, the sequence of steps from step S1 recommences.

Figure 7:
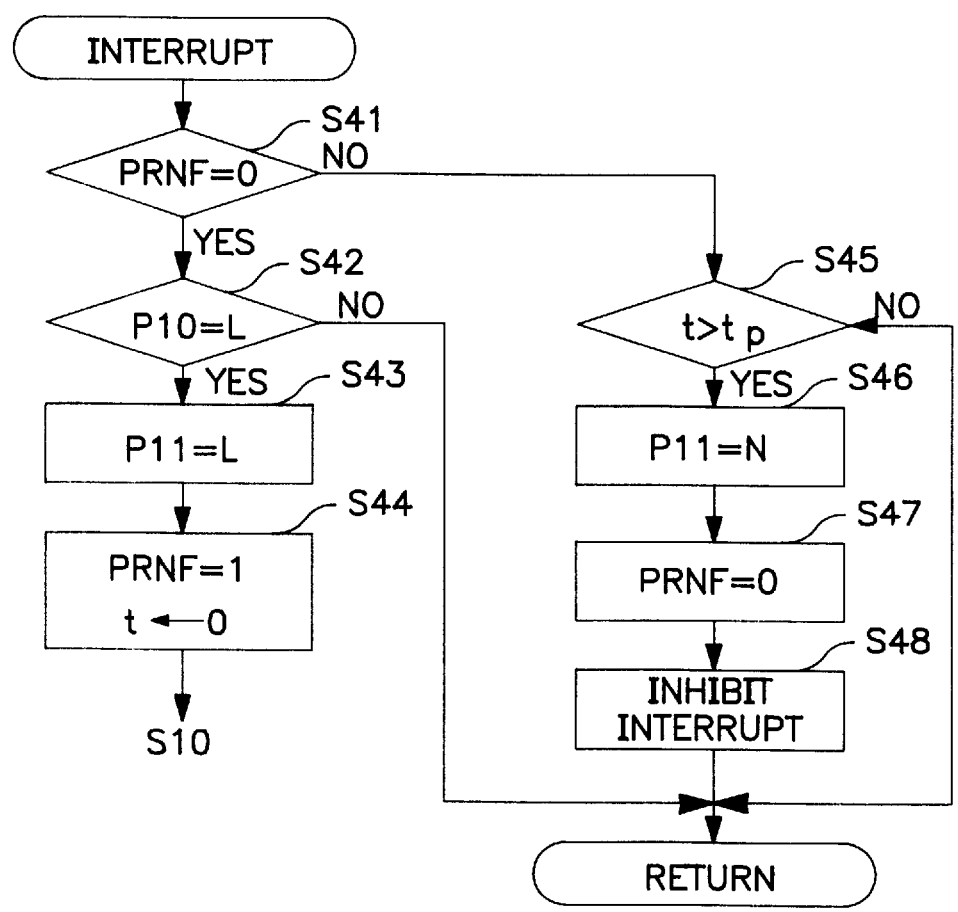
FIG. 7 is a flowchart of an interrupt subroutine called by the main routine shown in FIG. 6.

FIG. 7 is a flow chart of the release interrupt subroutine. This routine occurs when the interrupt is cancelled in step S9 (FIG. 6). The routine allows a fixed period of time (for example, 2 ms) to elapse between the performance of the operations of steps S1–S9 and steps S10–S12. When this routine reaches return, it resumes the process interrupted in FIG. 6. Interruption is inhibited directly after the introduction of a power supply (step S0), and interruption becomes possible for the first time after step S9.

When the interruption subroutine is carried out, firstly in step S41 it is determined whether or not the imprinting flag PRNF of the RAM of MCU 10 is 0. The imprinting flag PRNF becomes 1 when a release operation has been commenced by pressing the shutter button, and becomes 0 after a predetermined time has elapsed. This predetermined time is the transmission time of the imprinting signal. If the flag PRNF is 0 in step S41, the routine proceeds to step S42. If PRNF is 1, the routing proceeds to step S45. Before the release operation, the imprinting flag PRNF is 0, and the routine proceeds to step S42. In step S42, it is determined whether or not the input terminal P10 is L due to switch SW1 being ON. The routine proceeds to step S43 if the input terminal P10 is L, but if the terminal is H, the routine returns and recommences the process before the interrupt process. When the release button is depressed the release switch SW1 turns ON and P10 becomes L. The routine then proceeds to step S43. In step S43, terminal P11 is made L, an imprinting signal (signal which instructs the data back to imprint data) is caused to be generated for the high function data back 20. Continuing, in step S44, the imprinting flag PRNF is made 1, and the timer built into the MCU 10 is reset. This timer times the transmission time $t_p$ of the imprinting signal transmitted from the camera body to the data back. When step S44 ends, the routine jumps to step 10 of the aforementioned main routine of FIG. 6.

When entering the interrupt subroutine of FIG. 7 during the performance of step S11, the imprinting flag PRNF has a value of 1 due to step S44. The interrupt subroutine therefore proceeds from step S41 to step S45. In step S45, the value t of the aforementioned timer is compared with the transmission time $t_p$ of the imprinting signal set according to the sensitivity of the film loaded in the camera. Upon reaching $t_p$, the routine proceeds to step S46. If $t_p$ is not reached, the routine returns and recommences the process interrupted of FIG. 6.

When the predetermined transmission time $t_p$ is reached, the routine proceeds from step S45 to step S46, and in step S46, the terminal P11 for the imprinting signal use is made H, and signal transmission is provided from the camera body to the data back. In step S47, the flag PRNF is made 0. In step S48, interrupt is inhibited, and the routine returns to the interrupted process of FIG. 6. After this, in step S9 of FIG. 6, interrupt inhibition is again cancelled, and the interrupt routine of FIG. 7 is not performed.

Figure 8:
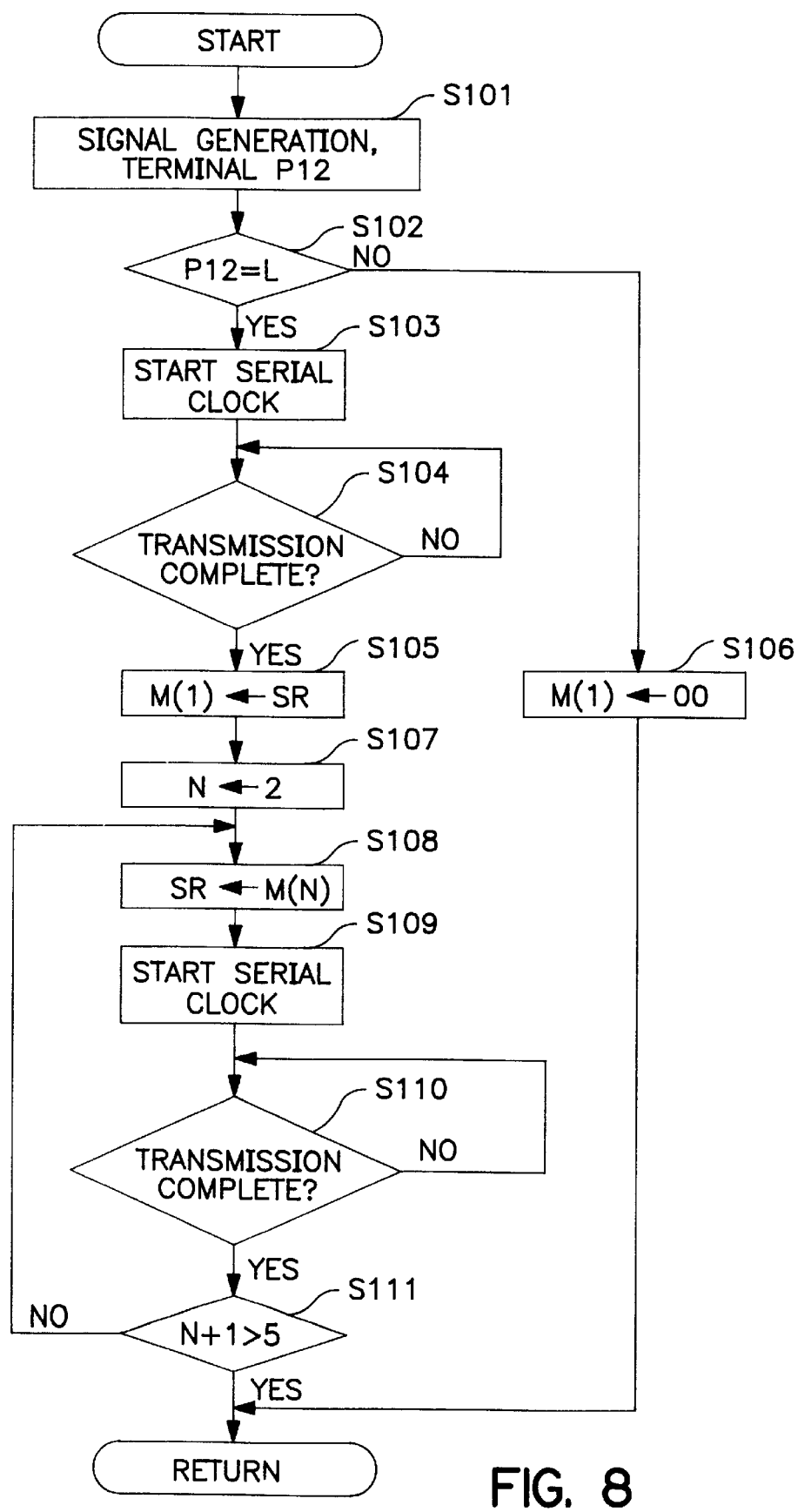
FIG. 8 is a flowchart of a communication subroutine called by the main routine shown in FIG. 6.

FIG. 8 is a flow chart of the communication subroutine of the MCU 10 called by step S1 of FIG. 6. In step S101, making terminal P12 L, waiting for a predetermined time makes this H. Here, making terminal P12 L means the generation of a starting signal which causes commencement of data communication with respect to the loaded data back. If the high function data back 20 is connected, the terminal Q12 of the MCU 21, connected via the contact point 1c and the contact point 20c, becomes L in response to the starting signal. Even though terminal P12 on the MCU 10 side may become H after a predetermined time, unless the terminal Q12 of the MCU 21 is L, terminal P12 is kept in the L state.

Continuing, in step S102 it is determined whether or not the input to terminal P12 is L. If terminal P12 is H, the subroutine proceeds to step S106, and if terminal P12 is L, the subroutine proceeds to step S103. If a high function data back 20 is connected, terminal P12 becomes L, and the subroutine proceeds to step S103. When the high function data back 20 is not loaded, terminal P12 is H, and the routine proceeds to step S106 in which the memory location M(1), which contains the data back flag is cleared. A determination as to whether the data back connected to the camera body 1 is a high function data back, a simple data back, or a normal back cover, is made by determining whether or not the terminal P12 falls to L.

In view of the above, the processes of steps 103 through 111 are only carried out when a high function data back 20 is mounted to the camera body. The processes from step S103 through step S105 are processes which receive the data back flag (byte No. 1) from the high function data back 20. In step S103, transmission of a serial clock from the camera body 1 to the data back is caused to start. Next, in step S104, the routine waits a predetermined time for complete transmission of the first byte and after this, waits until the MCU 21 of the data back side can receive the second byte. Continuing, in step S105, the communication data (data of the above-mentioned first byte) of the high function data back 20 contained in the shift register SR (not shown in the drawings) is stored in the memory location M(1) of MCU 10, which was shown in Table 1.

The processes from step S107 through step S111 are processes which send four bytes of data (the second byte through the fifth byte) to the high function data back 20 from the camera body 1. In step S107, the transmission data memory pointer N is set to 2. In step S108, the data (second byte of data, which relates to film sensitivity, N=2) of memory location M(N) of the MCU 10 is transferred to the shift register SR. In step S109, transmission of the serial clock to the data back from the camera is caused to start. In step S110, the data which was stored in the serial register SR is transferred to the MCU 21 of the data back. Step S110 waits a predetermined time until transfer of the current byte ends, and after this, waits until MCU 21 can receive the next byte (third through fifth bytes) of data. Continuing, in step S111, 1 is added to the memory pointer N. If N is greater than 5, the process returns and proceeds from step S1 (where the subroutine was called) to step S2 of FIG. 6. If N is 5 or less, the subroutine returns to step S108. After the transfer of the second byte of data, N=3, and the subroutine returns to step S108. The processes from step S108 through step S111 are repeated. After the fifth byte of data is transferred, returning, the subroutine shown in FIG. 8 ends.

Figures 9A, 9B:
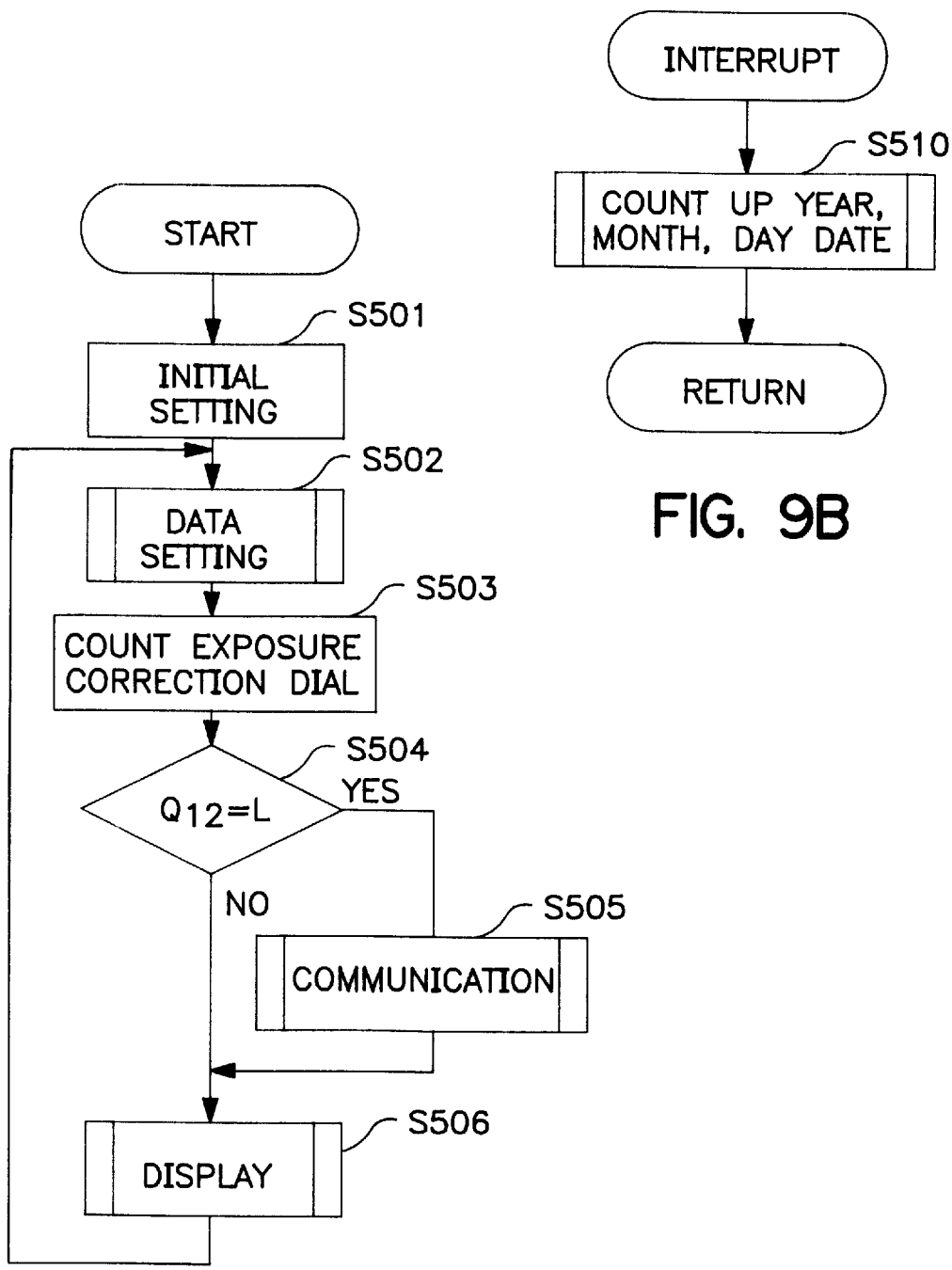
FIG. 9A is a flowchart of a main routine performed by an MCU contained in the high function data back shown in FIG. 5.
FIG. 9B is a flowchart of an interrupt subroutine called by the main routine shown in FIG. 9A.

FIG. 9A is a flow chart of the main routine of MCU 21 of the high function data back 20. When the MCU 21 is reset by loading a battery into the data back, an initial setting is performed in step S501. Also after battery OFF of the body the processes from step S502 through step S506 are reiterated.

In step S502, a data setting subroutine is called, the imprinting mode setting and similar settings are read out from the mode setting means 22, and the imprinting data is revised by means of data from the data setting means 23. In step S503, the rotation direction and rotation click number of the exposure correction dial 27 are read and stored as a signed integer in four bits of the first byte (memory location DM(1) of MCU 21). In step S504, it is determined whether or not terminal Q12 is L. When terminal Q12 is L, communication with the body MCU 10 begins. At this time, proceeding to step S505, the transfer of data with the MCU 10 is performed, calling the communication subroutine shown in FIG. 10. Communication with the body MCU 10 does not start when terminal Q12 is H, and instead, the routine proceeds to step S506. At step S506, if communication was performed at step S505, the data set in step S502 and communicated in step S505 is displayed. If communication was not performed at step S505, the data set in step S502 is displayed at step S506. When step S506 ends, the routine returns to step S501 the process repeats.

FIG. 9B is a flow chart of an interrupt subroutine for MCU 21 built into the high function data back 20. The timer built into MCU 21 ticks by means of a timer interrupt every second, to track (count) the date (year, month and day). On reaching return, the interrupted process of FIG. 9A is recommenced.

Figure 10:
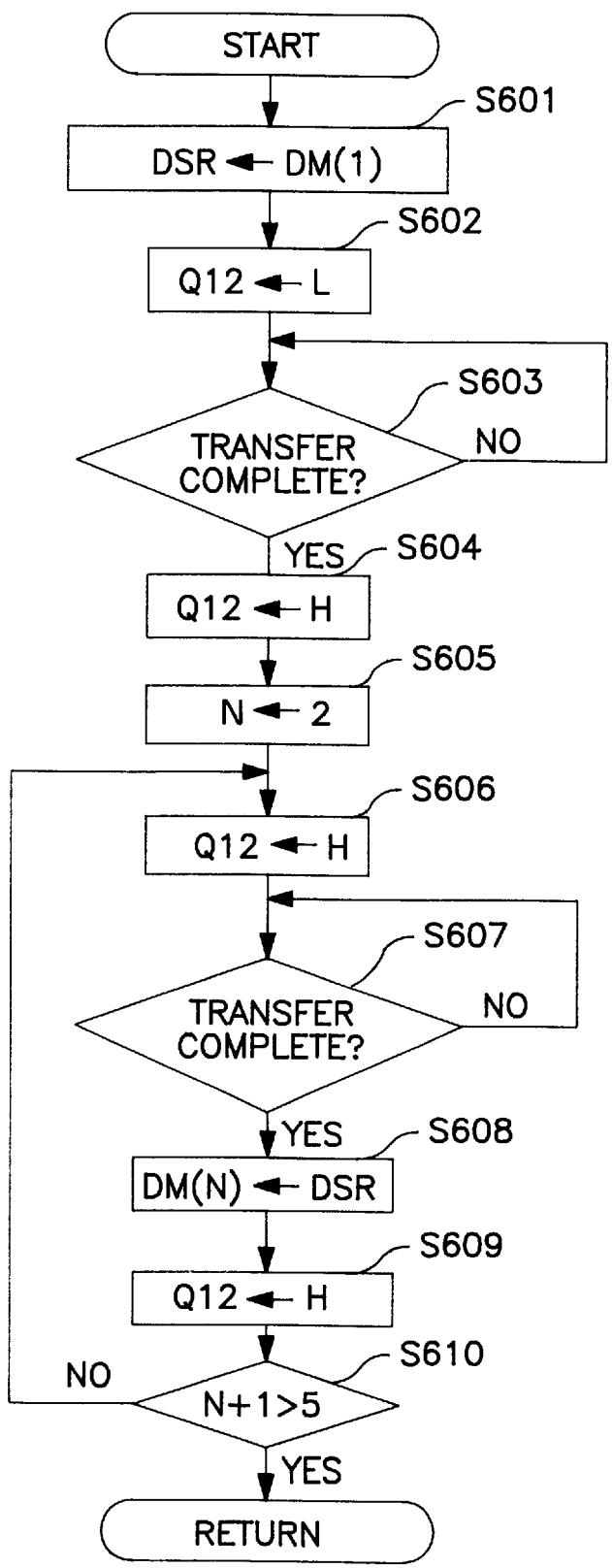
FIG. 10 is a flowchart of a communication subroutine called by the main routine shown in FIG. 9A.

FIG. 10 is a flow chart of the communication subroutine of the MCU 21 which is called by step S505 of FIG. 9A and corresponds to the communication subroutine of the camera body 1 shown in FIG. 8.

In step S601, in order to transfer the data back flag from the high function data back 20, the data of memory location DM(1) of MCU 21 is transferred to a serial register DSR (not shown in the drawings) of the MCU 21. In step S602, terminal Q12 is made L, indicating that the preparations for transmission are complete. Furthermore, terminal P12 has already become L in step S503. After this, even though terminal P12 may become H, if terminal Q12 becomes L, terminal P12 can be kept at L. A serial flag, 1 byte (8 bits) of data, becomes 0 when data transfer commences, and counts serial clock pulses from the MCU 10. Serial flag becomes 1 after 8 pulses are counted thus indicating that one byte has been transferred. Step S603 is repeated until the serial flag becomes 1. Continuing, the routine proceeds to step S604. In step S604, the terminal Q12 is made H, showing that 1 byte of communication has been completed.

In step S605, the memory location pointer N for the memory DM (N) which stores the data received from the camera body 1 is set to 2. After this, in step S606, terminal Q12 is made H, thus showing that preparation for transmission has been completed. In step S607, similarly to step S603, the process repeats until serial transmission ends, namely until the above-mentioned serial flag becomes 1. Continuing, in step S608, data which has been transferred to the serial register DSR of the MCU 21 is stored in memory location DM(N) of the MCU 21. In step S609, making terminal Q12 H indicates that communication of 1 byte has been completed. In step S610, 1 is added to the communication memory pointer N. If N is 5 or less after 1 has been added, the subroutine returns to step S606, and thereafter reception of the third byte of data is performed. If N exceeds 5, returning, the subroutine ends, and the routine proceeds to step S506 of FIG. 9A.

Figure 11:
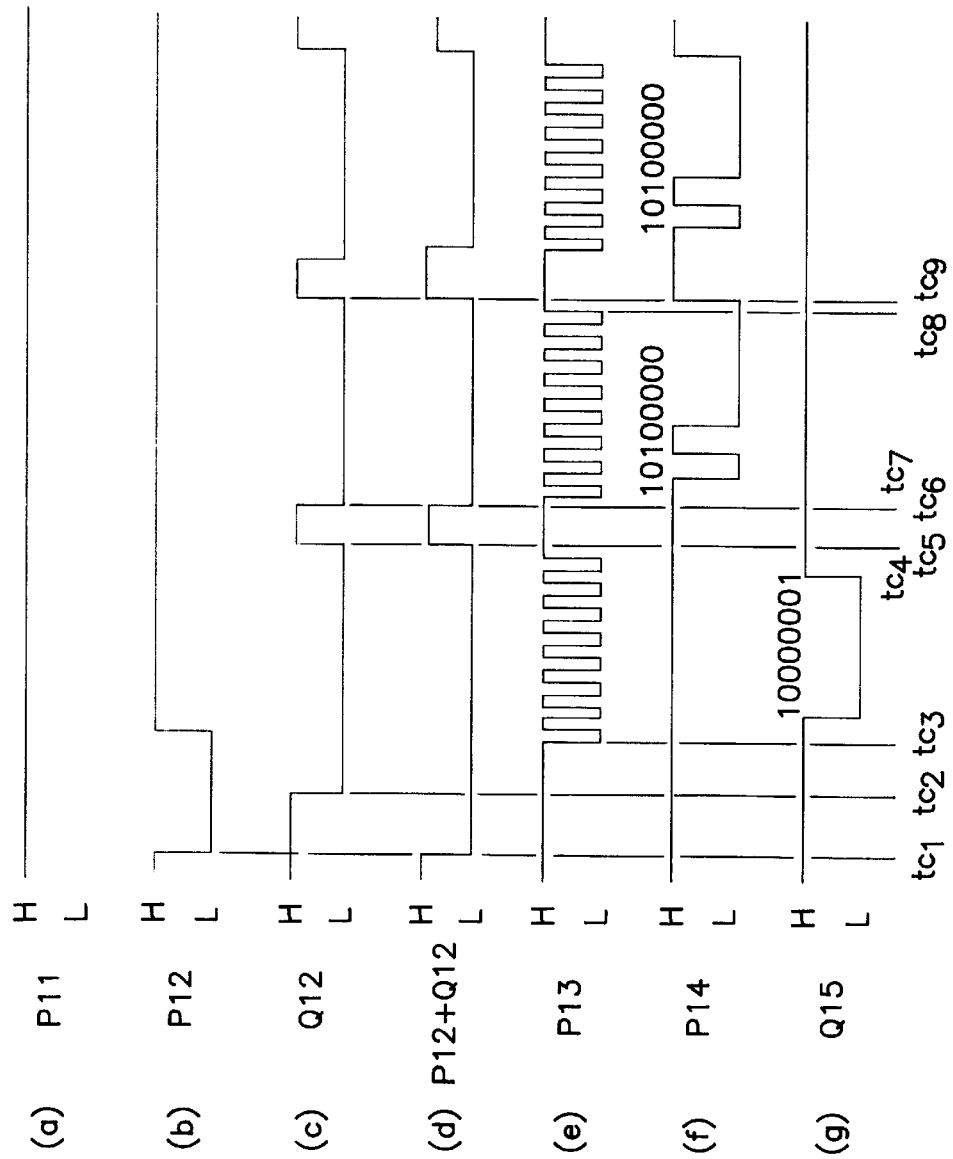
FIG. 11 is a timing chart illustrating the timing of steps performed by the first preferred embodiment of the invention.

FIG. 11 is a timing chart showing the potentials of ports P11 through P14, G12, Q12+P12 and Q15 of the camera body 1 and the high function data back 20. The trends shown in the flow charts of FIGS. 8–10 are illustrated with this Figure.

The MCU 10 puts a start in terminal P12 at time $t=tc_1$ in step S101. The MCU 21, capturing this start signal at step S504 during the loop: step S502→step S503→step S504→step 506→step 502, proceeds to step S505 from step S504 and carries out the communication routine of FIG. 10.

The MCU 21, in step S601 of FIG. 10, transfers the communication data of the first byte DM(1) (data back flag) to the serial register DSR of the MCU 21. In step 602 MCU 21 makes the Q12 terminal L ($t=tc_2$). Thereafter, MCU 10 may set the terminal P12 to H at time $t=tc_3$. Next, proceeding to step S102, it is determined whether or not the terminal P12 is L. The state of the terminals P12 and Q12 when they are connected via the contact point 1c and the contact point 20c, as in FIG. 5, because drawn to be unchanged L in terminal Q12, proceeding from step S102 to step S103, causes the start of transmission of a serial clock from the MCU 10 to the MCU 21 (FIG. 8). Thereafter, because terminal P13 in relation to the contact point 20d is linked to the serial clock terminal Q13 of the MCU 21, data back flag (first byte) is output synchronously with the serial clock, from the serial output terminal Q15 of MCU 21. The data of the first byte is output one bit at a time from its LSB.

This output is transmitted, via the contact point 20f of the data back 20 and the contact point 1f of the camera body 1, to the input terminal P15, one bit at a time synchronously with the serial clock, and is transferred to the serial register SR of MCU 10. The transfer of 1 byte ends at the time point ($t=tc_4$) when 8 clock pulses have been output from the terminal P13. Thereafter, the serial flag of MCU 21 becomes 1, and the process proceeds from step S603 to step S604, and terminal Q12 is made H ($t=tc_5$). Continuing, at step S605 the memory pointer N is set to 2. At step S606, the terminal Q12 is made L ($t=tc_6$). At step S607 the serial flag is made 0 and, after this, step S607 repeats until serial flag is 1.

On the other hand, in step S104 the MCU 10 waits for a predetermined time (the time until the transmission of the first byte ends, and after this, until the state becomes 1, at which time the MCU 21 of the high function data back can receive the second byte). MCU 1 waits for MCU 21 to be capable of receiving data. If the change of terminal Q12 L→H→L is monitored by means of terminal P12, the time is monitored reliably and quickly. Proceeding from step S104 to step S105, the data back flag which was transferred to the serial register SR is transferred to the memory location M(1) of the MCU 10. Continuing, in step S107 the memory pointer N is set to 2, in step S108 the data stored in the memory location M(N) is transferred to the serial register SR of the MCU 10. Because initially N=2, the film sensitivity of the second byte is transmitted to the serial register SR. In step S109, the transmission of the serial clock from MCU 10 to MCU 21 is caused to start ($t=tc_7$). Continuing, step S10 waits for transfer of the serial clock to be completed and for the data back to be capable of receiving more data. If the film sensitivity is ISO 100 (SV=5), a binary number 00000101 is output from the LSB synchronously with the clock from the serial output terminal P14 of the MCU 10. The transmission of 1 byte ends at the time ($t=tc_8$) when 8 clock bit pulses have been output. Thereafter, the serial flag of the MCU 21 becomes 1 and, proceeding from step S607 to step S608, the data which was transmitted to the serial register DSR of the MCU 21 is transmitted to the memory location DM(N) of the MCU 21. Because N=2 initially, the film sensitivity data is stored in memory DM(2) of the MCU 21. Continuing, at step S609, terminal Q12 is made H ($t=tc_9$). At step S610, 1 is added to the memory pointer N, (the program returns if the pointer N exceeds 5). In the initial run 2 is changed to 3 and the program proceeds to S606. The data of the third byte is awaited. On the other hand, the MCU 10 in step S10 waits a predetermined time and in step S111, 1 is added to the memory pointer N. When N exceeds 5 the program returns, but because the pointer is initially changed from 2 to 3, the program proceeds to step S108. Consequently, transmission of the data of the third byte is performed. Then, steps S108 through step S111 and steps S606-step S610 are repeated until N=5. During this time, the time chart of FIG. 11 becomes a waveform similar to that from $t=tc_6$ through $t=tc_9$. When the transmission and reception of all 5 bytes has been completed, MCU 10 and MCU 21 both return from the respective communication subroutines, and one sequence of communication has been completed.

Figure 13:
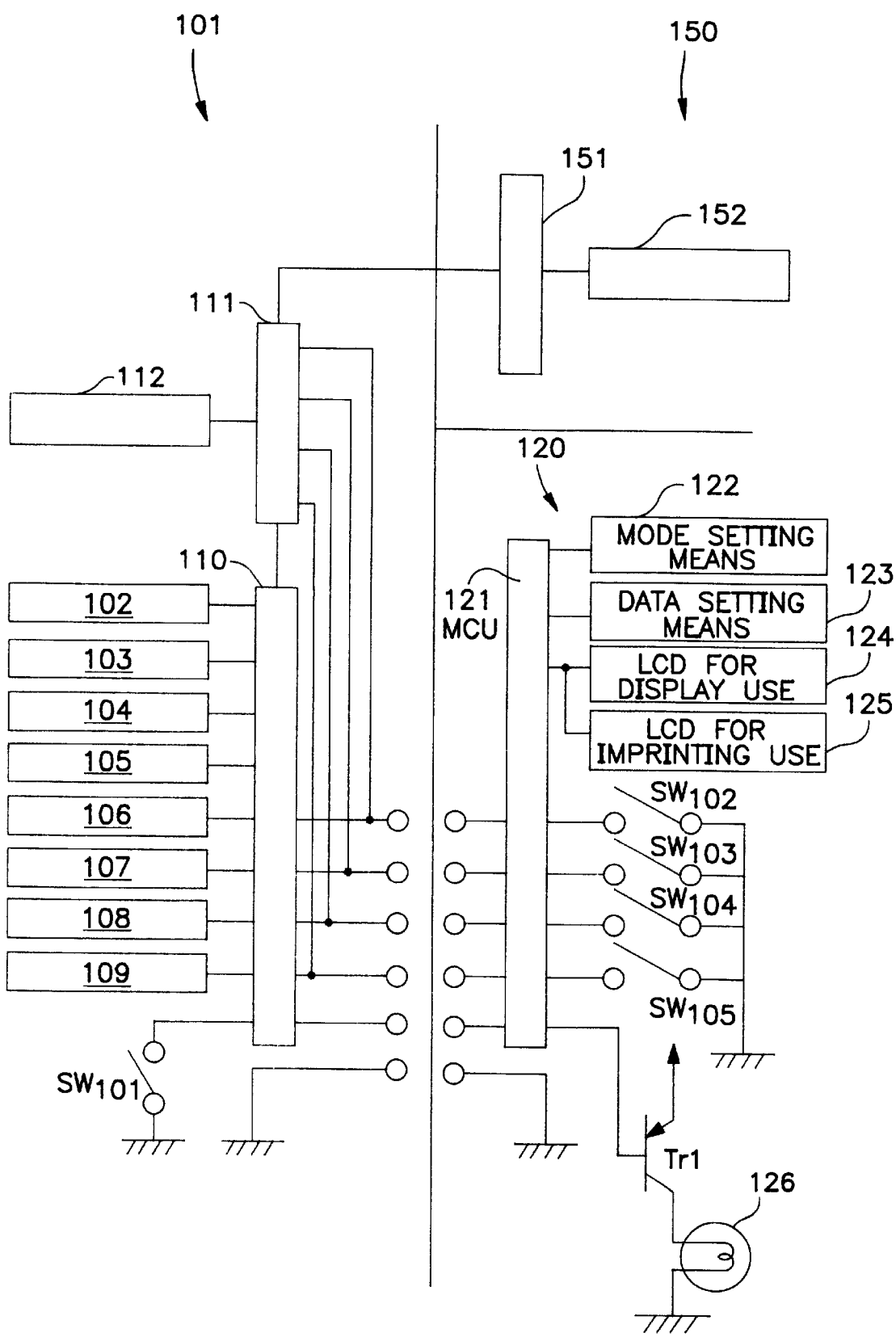
FIG. 13 is a block wiring diagram showing a second preferred embodiment of the invention, used with a high function data back.

FIG. 13 is a block diagram of a second preferred embodiment of the present invention. Reference numerals 102 through 109 correspond respectively with reference numerals 2 through 9 of FIG. 1. Reference numeral 101 represents a camera body, reference numeral 120 represents an accessory (here a data back) which can be mounted to the camera body 101. Reference numerals 110 and 111 represent an MCU and an AF CPU, respectively. Accessory 120 is a high function accessory having an MCU 121 which can communicate with the camera body. Reference numerals 122 through 126 correspond respectively with reference numerals 32 through 36 of FIG. 1. Reference numerals 150 through 152 respectively represent an AF unit, a lens MCU and an AF motor.

Figure 14:
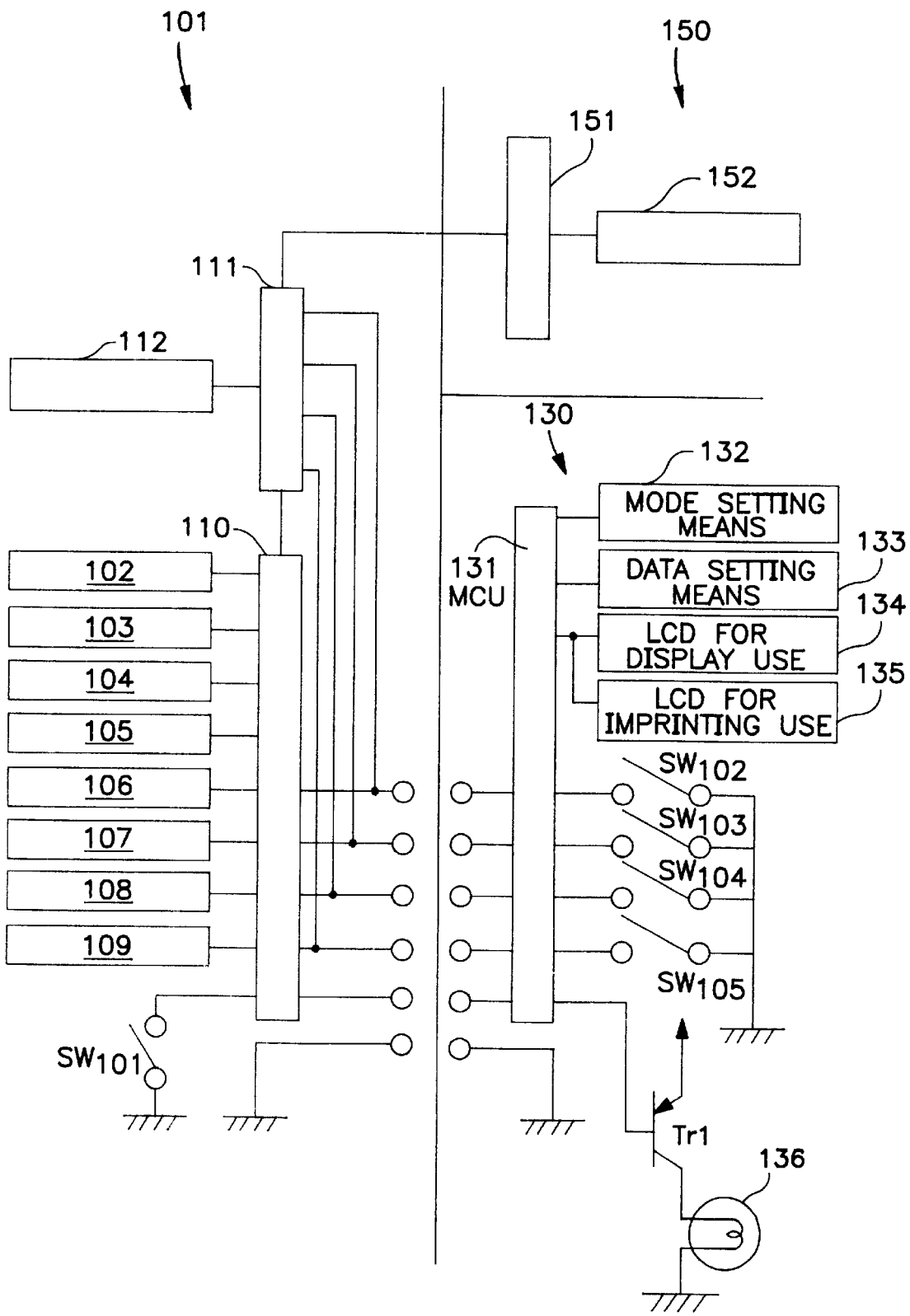
FIG. 14 is a block wiring diagram showing the second preferred embodiment of the invention, used with a simple data back.
Figure 15:
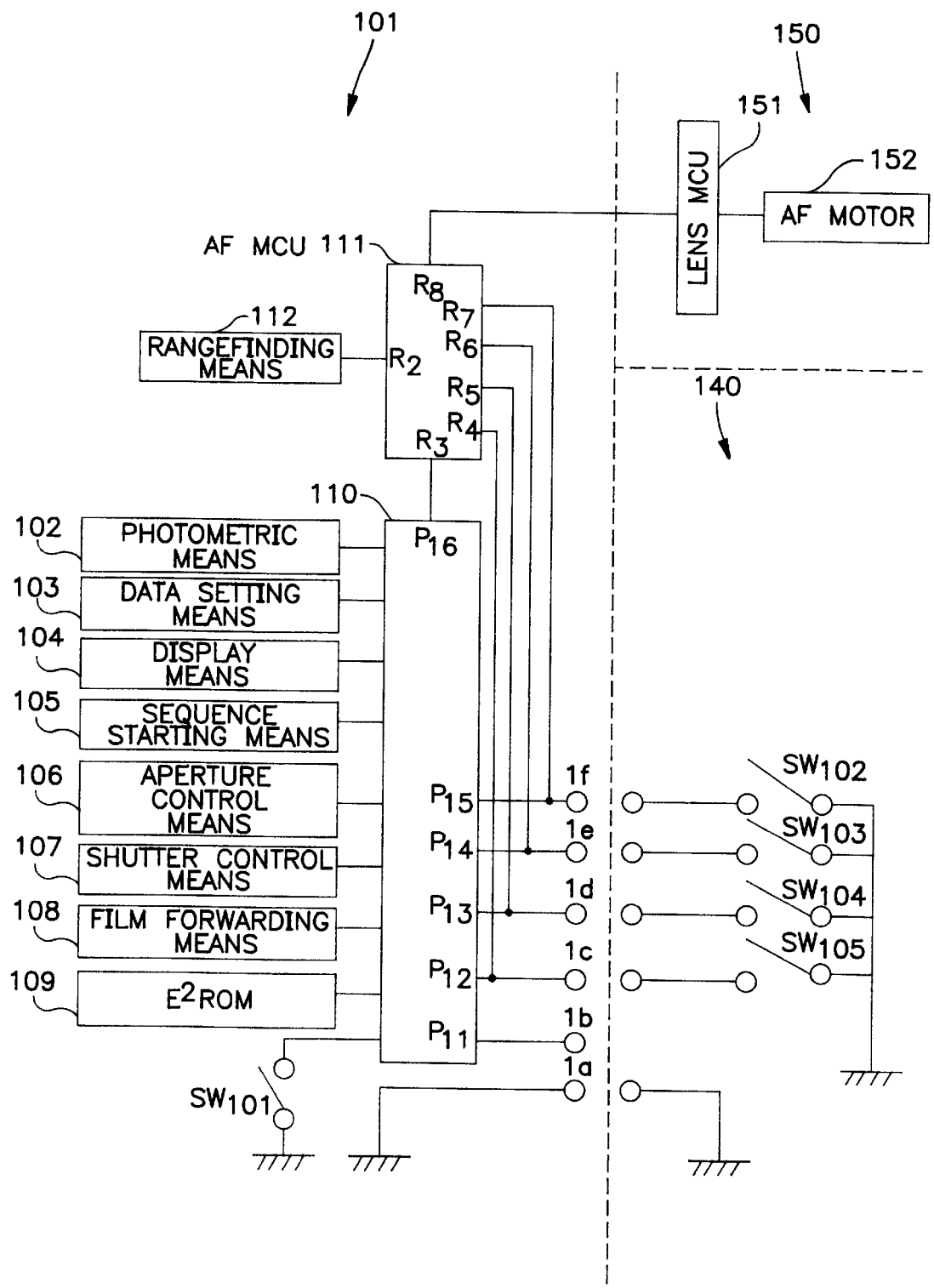
FIG. 15 is a block wiring diagram showing the second preferred embodiment of the invention, used with a normal back cover.

FIG. 14 is a block diagram of the second preferred embodiment used with a simple function type of accessory (simple data back 130), which is not capable of communicating with the camera body. Reference numerals 131 through 136 correspond respectively with reference numerals 121 through 126 of FIG. 13. FIG. 15 is a block diagram of a normal back cover 140, which has no data back function, mounted to a camera body 101. Switches SW102–SW105 are AF area selectors. The normal back cover 140 is also incapable of data communication with the body. Points of difference from the first embodiment example are described hereinbelow.

Figure 16:
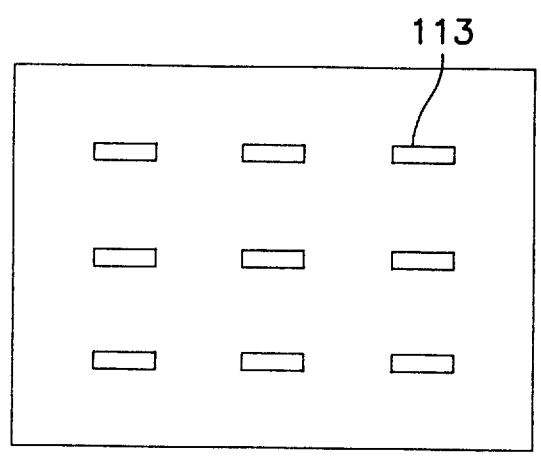
FIG. 16 is a front view of a viewfinder display according to the second preferred embodiment of the invention.

FIG. 16 is a plan view showing a display within the viewfinder of the second preferred embodiment of the present invention. The display is equipped with plural rangefinder areas 113 which measure the range to the subject, and it is possible to select one or several range areas 113. In the selected range area(s) 113, a display is superimposed in the viewfinder, by means of an LED, LCD or similar display means, and a display is also displayed by an external LCD. One range area is selected in the following description, but the camera may automatically select plural range areas and similar effects are obtained.

In a high function data back, AF area selectors are disposed as operating members. AF area selectors are operating members which are capable of oscillation. Four switches SW102–SW105 are disposed internally. Switches SW102 through switch SW105 respectively correspond with movement up, down, left and right, of AF area selectors. When a switch SW becomes LOW, the range area selected moves. That is, when an AF area selector is operated in an upward direction, SW102 becomes LOW, and switches SW103 through SW105 become HI. Moreover, when an AF area selector is operated obliquely to the top right, switch SW102 and switch SW105 become LOW, and switches SW103 and SW104 become HI.

The MCU 121 of the high function data back reads switches SW102 through SW105, and transmits the state of switches SW102 through SW105 as four bits of data while communicating with the body. The MCU 110, based on the received data, sets the rangefinding points from among plural range points, sends to the AF CPU 111. The AF CPU 111 performs rangefinding for the rangefinding points which were set, sending the results of the rangefinding to the lens MCU 151. The AF motor 152 is driven by the lens MCU 151.

The AF area selectors disposed in the simple data back 130 and the high function data back 120 are connected to the AF MCU 111 of the body via contact points.

Figure 17:
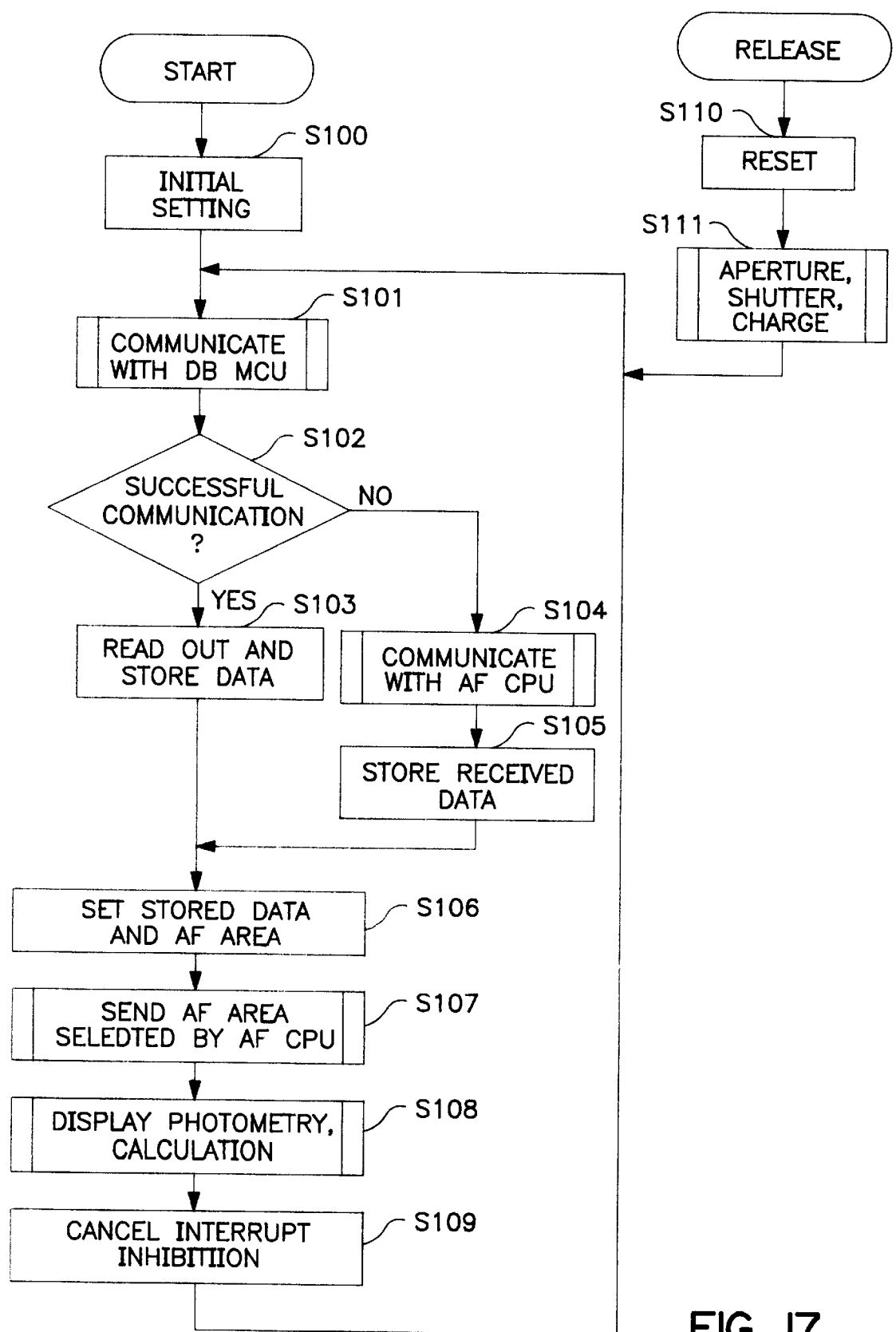
FIG. 17 is a flowchart of a routine performed by an MCU contained in the body shown in FIGS. 13–15.

FIG. 17 is a main flow chart of the body MCU 110. Describing points of difference from the first embodiment example, in step S101 communication is performed with the data back MCU 121. In step S102, it is determined whether or not communication succeeded. In the case that communication succeeded, proceeding to step S103, from the received data is read and the AF area selector data is stored. If communication was unsuccessful, it is believed that a simple data back 130 or a normal back cover 140 is mounted. In this case, proceeding to step S104, communication is performed with the AF MCU 111. The AF MCU 111 receives the area selector data which was received, and at step S105 this data is stored. At step S106 the data which was stored is set together with the AF area. In step S107, data is sent showing the AF area which was selected by the AF MCU 111. In step S108, photometry, calculation, and display are performed. The display of the selected AF area is performed.

Figure 18:
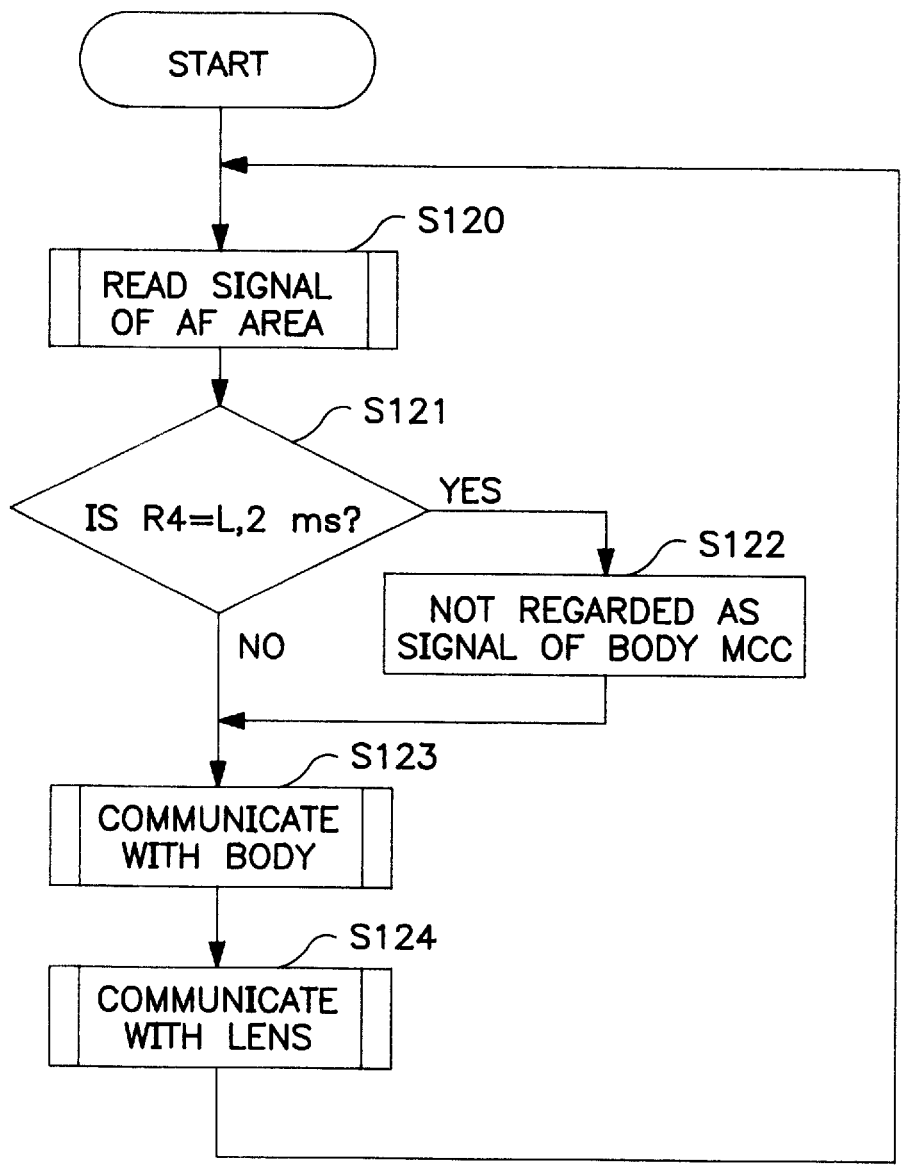
FIG. 18 is a flowchart of a routine performed by an AF MCU located in the body shown in FIGS. 13–15.

FIG. 18 is a flow chart of the AF MCU 111. In step S120, AF area selector signals are read via ports R4 through R7. In step S121, it is determined whether or not R4 is LOW in a 2 ms interval. This is in order to make P12 LOW for a fixed time (here 2 ms), when the body MCU 110 attempts to communicate with an MCU in the high function data back 120. If the time LOW became the same as this time there is no signal of switch SW105 regarded as a signal of the body MCU 111. This time (2 ms) is a sufficiently shorter time than the occurrence of a signal in the case of human operation. Here if R4 was LOW for 2 ms, the process proceeds to step S122, this signal is not a signal of switch SW105 and is not regarded as a signal of the body MCU 110.

After this, proceeding to step S123, communication is performed with the body, data of the AF area selector is sent to the body, and the position of the AF area which was selected is received. In step S124, rangefinding is performed by the rangefinding means 112 and, exchanging messages with the lens MCU 121, drive data of the AF motor is sent. The imprinting method, in the case of a simple data back 130, the body MCU 110 controls the illumination time of the imprinting lamp, but different control is performed by the two kinds of data backs. In the case of a high function data back 20, the data back MCU 21 controls the imprinting lamp. It should be noted that control of imprinting, in general, is known as disclosed in Japanese Laid-Open Patent Publication 1-297638. As such, a description is omitted here.

In accordance with the preferred embodiments of the present invention for the imaging device and imaging system as described hereinabove, when the discriminating means determines that a first accessory is mounted, the generated electrical output of a first operating member is received. When the discriminating means determines that a second accessory is mounted, data prepared by a data preparation means is received. The invention thus avoids superfluous signal lines to an accessory which is capable of communication and it is not necessary to arrange a MCU in order to cause communication with an accessory which is incapable of communication. Accordingly, cost is reduced.

Although a few preferred embodiments have been shown and described, it would be appreciated by those skilled in the art that changes may be made in these embodiments without departing from the principles and spirit of the invention, the scope of which is defined in the claims and their equivalents.

What is claimed is:
1. An imaging system, comprising:
an imaging device;
a first accessory or a second accessory mounted to the imaging device,
the first accessory being capable of external operation, and having a first operating member which generates an electrical output according to the external operation of the first accessory,
the second accessory being capable of external operation, and having a second operating member which generates an electrical output according to the external operation of the second accessory, the second accessory having a data preparation device which prepares data based on the electrical output generated by the second operating member;
a discriminating device which determines whether the first accessory or the second accessory is mounted to the imaging device; and
electrical receptors for receiving the electrical output from the first operating member when the discriminating device determines that the first accessory is mounted to the imaging device, and receives data prepared by the data preparation means when the discriminating device determines that the second accessory is mounted to the imaging device.

2. An imaging system according to claim 1, wherein the first and second operating members perform the same function.

3. An imaging system according to claim 2, wherein
the imaging device records an image from a photographic picture plane,
the photographic picture plane is divided into plural areas, and
the first and second operating members are area selection members which select a specific area from the plural areas of the photographic picture plane.

4. An imaging system according to claim 2, wherein the first and second operating members perform an exposure correction function.

* * * * *